Dec. 21, 1948.  W. W. WOHLFORTH  2,456,805
SIDE GATE ELEVATOR FOR TRUCKS
Filed March 1, 1947  2 Sheets-Sheet 1
Fig.1.
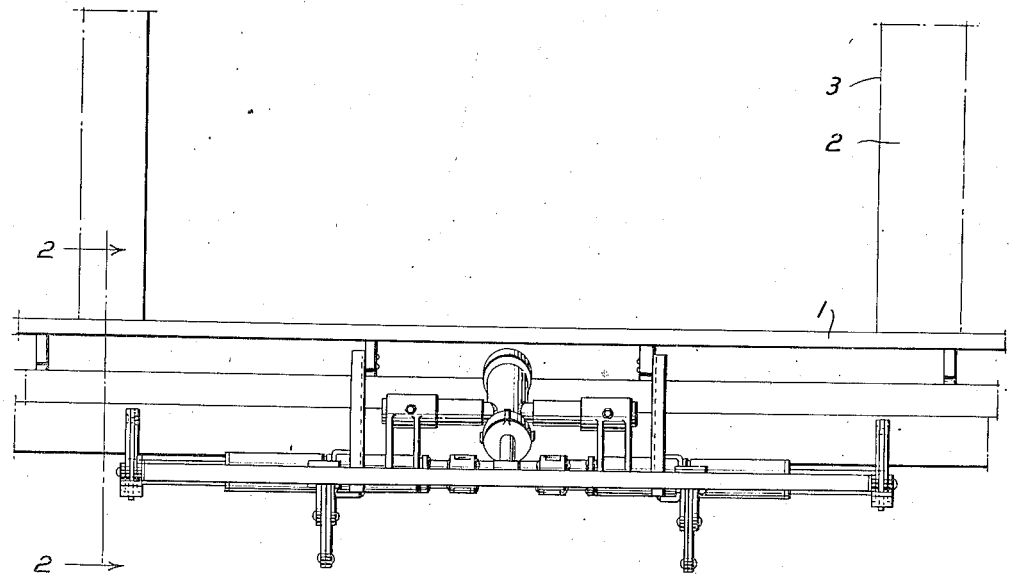
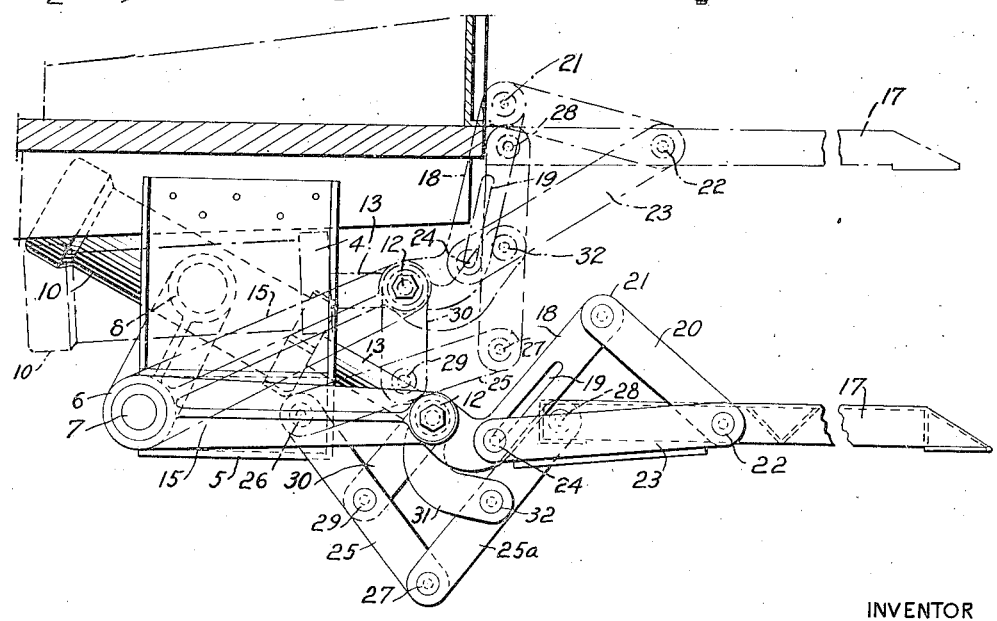
Fig.2.
INVENTOR
WALTER W. WOHLFORTH
By John A. Naismith
ATTORNEY Dec. 21, 1948.   W. W. WOHLFORTH   2,456,805
SIDE GATE ELEVATOR FOR TRUCKS
Filed March 1, 1947                      2 Sheets-Sheet 2

INVENTOR
WALTER W. WOHLFORTH
BY
ATTORNEY

Patented Dec. 21, 1948

2,456,805

UNITED STATES PATENT OFFICE 2,456,805

SIDE GATE ELEVATOR FOR TRUCKS

Walter W. Wohlforth, San Francisco, Calif., assignor to The Heil Co., Milwaukee, Wis., a corporation of Wisconsin Application March 1, 1947, Serial No. 731,753

6 Claims. (Cl. 214—77)

1

This invention relates particularly to that type of devices mounted on the modern automotive trucks for the purpose of loading freight or heavy goods thereon and for unloading such goods therefrom.

It is one object of the invention to provide a device of the character indicated that will be compact in form and arrangement as well as compact in its method of operation; that is one in which the lifting and lowering platform is operated vertically and consequently requires but little more than the horizontal area of the platform itself in which to operate.

It is a further object of the invention to provide a lifting platform of the character indicated so constructed and arranged that it may be easily swung from a horizontal to a vertical position when raised, to form a truck door. In these days of traffic congestion it would be a great advantage to load or unload a truck from one side instead of at the rear where loaders have heretofore been placed, and at the same time to use the lifting platform for a door for the side of the truck. In order that the platform may be caused to function in this dual manner I provide a series of connected arms and links that move it through a vertical plane and function as a hinge that permits the platform to be swung into or out of registration with the door opening in the side of the truck, the entire operation taking place outside of the truck body and in no manner interfering with the truck floor or the load carried thereby.

It is also an object of the invention to provide means of the character indicated that may easily be applied to any truck, that will be strong and durable but not overheavy or cumbersome, economical to manufacture, and highly efficient in its practical application.

In the drawing:

Figure 1 is a front elevation of a portion of the side of a truck body with my elevating device in position.

Figure 2 is an end elevation of the device at 2—2 on Figure 1.

Figure 3:
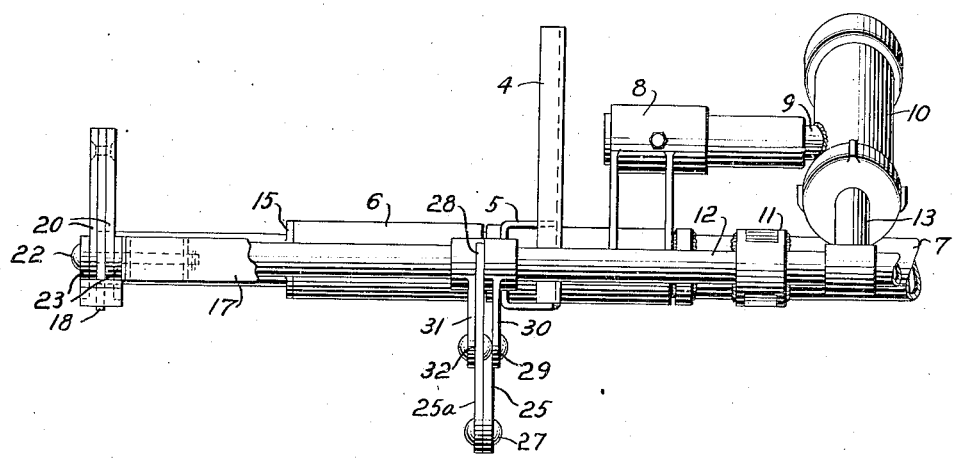
Figure 3 is a front elevational view of the device with approximately one-half removed.
Figure 4:
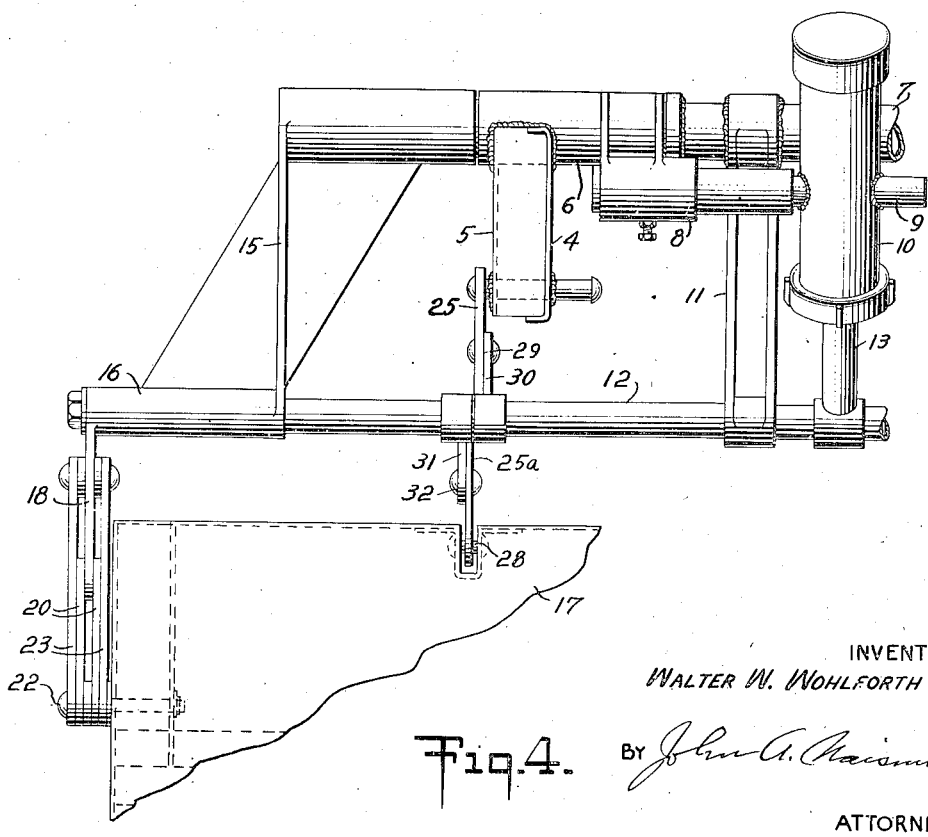
Figure 4 is a top plan view of the device as in part in Figure 3.

While I have shown and described only the preferred form of my invention, it should be understood that various changes and modifications may be made within the scope of the claims attached hereto without departing from the spirit of the invention.

2

Referring now more particularly to the drawing, I show at 1 a portion of the floor structure of a truck, and at 2 a portion of the side wall of the truck body, with the doorway indicated at 3.

The structure now to be described is duplicated at opposite ends of the lifting platform.

At 4 is shown a plate depending from the floor structure 1, and this has welded thereto a box-like element 5 along its bottom edge to provide a rigid support for the parts hereinafter described.

The parts 4 and 5 rigidly support a horizontal bearing member 6 through which passes a rotatable shaft 7, and it also rigidly supports a bearing member 8 in which is journaled a shaft 9 mounted integrally on the side of hydraulic cylinder 10 so that the cylinder may swing up and down as its operation requires.

Extending forwardly from shaft 9 is an arm 11, fixedly attached thereto to move therewith, its free end supporting a horizontal bar 12, the said bar 12 also lying parallel with the shaft 9. The piston-rod 13 operated by the hydraulic cylinder 10 is also connected to the bar 12 and is operable to raise or lower the same as the cylinder oscillates on its trunnions.

Mounted on the end of shaft 7 as at 14 is a bearing member 15, the bearing portion 16 rotatably engaging the rod or bar 12 as shown.

A linkage and hinge arrangement connects the bearing portion 16 with the adjacent end of the platform 17 and comprises a bell crank shaped lever 18 projecting forwardly and upwardly from bearing portion 16 and having a slot 19 formed therein extending from the angular portion thereof outwardly toward its outer end. A link 20 connects the outer end at 21 with a pivot 22 in the end of platform 17 and spaced back a little way from the rear edge of the platform. Another link connects the pivot 22 as at 23 with the slot 19 through the medium of pin 24 mounted in the end of link 23 and slidably engaging the slot 19.

Another linkage assembly connects the part 5 with the rear edge of platform 17 and comprises a link 25 pivotally mounted at one end 26 on the forward end of part 5 and pivotally connected at 27 at its other end to another link 25a of equal length which is pivotally connected at its other end, at 28, to the rear edge of the platform 17. The central point 29 of link 25 is connected by a short link 30 to the bar 12, the link 30 being one-half the length of link 25.

A bell-crank shaped link 31 pivotally connects the bar 12 and the central point 32 on link 25a.

In the drawing the platform 17 and its operating parts is shown in a position half way between its highest and lowest positions. Assuming the movement to be upwards due to the pulling action of piston-rod 13 on bar 12, the forced upward movement of bar 12 pulls the link 25 upwardly through the medium of short link 30 and operates in the same manner on link 25a through the medium of short link 31 which also operates to prevent link 25a from spreading relative to link 25 and consequently causes the rear edge of platform 17 to rise in substantially a straight line.

The forward portion of platform 17 is raised simultaneously, and with the same speed, as the rear edge as above described since the lever 18 is formed integrally with bearing portion 16 and moves with the bar 12 even as the short links 30—31 move as a unit as bar 12. The lifting effect of part 18 is applied through the link 20 and the link 20 is prevented from swinging inwardly when a load is applied to the platform by means of a brace 23.

When the platform 17 has reached the level of the truck floor and the load removed therefrom it may quickly be turned up into a vertical plane about 28 as a pivot since the pin 24 slides in slot 19 and permits link 20 to swing about the pivot 22 into vertical alignment with the part 18.

When operated as above described the platform acts as a door for the doorway 3. All of the parts described above may be so proportioned and assembled that the platform 17 will form a perfect closure for the doorway and will in no way affect the bed of the truck.

I claim:

1. A platform as described comprising, a highway truck having a doorway formed in the side thereof and a shallow recess formed in the side edge thereof the truck floor to coincide with the width of the door opening, an elevating platform operative as a closure for the said doorway, and platform operating means for said platform comprising supporting means depending from the truck body, an hydraulic cylinder associated with the supporting means for rotative movement on a horizontal axis, a horizontally disposed bar carried by the outer end of the hydraulic cylinder, a shaft rotatively mounted relative to the supporting means, and parallelly arranged relative to the horizontal bar, bearing members centered upon the axis of the said shaft and supporting said bar, a bell-crank shaped element projecting forwardly from one of said bearing members and having a slot formed longitudinally therein, a link pivotally attached to the outer end of said element at one end and to the platform at its other end, a link pivotally connected to said last mentioned end having slidable connection with the element and a parallel motion linkage connecting the supporting means with the rear edge of the platform.

2. In an elevator for truck gates, a pair of spaced supporting brackets depending from the truck body adjacent an edge thereof; a first horizontally extending shaft adjacent said supporting brackets; an hydraulic ram positioned above said shaft and having horizontally extending trunnions projecting from opposite side wall portions thereof; bearing means fixed to said supporting brackets for rotatably supporting said first shaft and said trunnions; a second horizontally extending shaft spaced from said first shaft and parallel thereto, said second shaft being connected to the piston rod of said hydraulic ram; at least one bearing member connecting said second shaft with said first shaft; a bell-crank shaped element movable with said bearing member and projecting outwardly therefrom; means for pivotally connecting the outer end of said bell-crank shaped element with the truck gate at a point spaced from the inner edge of said gate; and parallelogram linkage connecting portions of the supporting brackets spaced outwardly from said first shaft with inner edge portions of the truck gate, said linkage also being pivotally connected to said second shaft.

3. In an elevator for truck gates, a pair of spaced supporting brackets depending from the truck body adjacent an edge thereof; a first horizontally extending shaft parallel with and spaced below said body edge and positioned adjacent said supporting brackets; an hydraulic ram positioned above said shaft and having horizontally extending trunnions projecting from opposite side wall portions thereof; bearing means fixed to said supporting brackets for rotatably supporting said first shaft and said trunnions; a second horizontally extending shaft spaced outwardly from said first shaft and parallel thereto, said second shaft being connected to the piston rod of said hydraulic ram; at least one bearing member connecting said second shaft with said first shaft; a bell-crank shaped element movable with said bearing member and projecting outwardly therefrom; means for pivotally connecting the outer end of said bell-crank shaped element with the truck gate at a point spaced from the inner edge of said gate; and parallelogram linkage connecting portions of the supporting brackets spaced outwardly from said first shaft with inner edge portions of the truck gate, said linkage also being pivotally connected to said second shaft.

4. In an elevator for truck gates, a pair of spaced supporting brackets depending from the truck body adjacent an edge thereof; a first horizontally extending shaft adjacent said supporting brackets; an hydraulic ram positioned above said shaft and having horizontally extending trunnions projecting from opposite side wall portions thereof, the axis of said trunnions being parallel with the axis of said first shaft; bearing means fixed to said supporting brackets for rotatably supporting said first shaft and said trunnions; a second horizontally extending shaft spaced from said first shaft and parallel thereto, said second shaft being connected to the piston rod of said hydraulic ram; at least one bearing member connecting said second shaft with said first shaft; a bell-crank shaped element movable with said bearing member and projecting outwardly therefrom; means for pivotally connecting the outer end of said bell-crank shaped element with the truck gate at a point spaced from the inner edge of said gate; and parallelogram linkage connecting portions of the supporting brackets spaced outwardly from said first shaft with inner edge portions of the truck gate, said linkage also being pivotally connected to said second shaft.

5. In an elevator for truck gates, a pair of spaced supporting brackets depending from the truck body adjacent an edge thereof; a first horizontally extending shaft adjacent said supporting brackets; an hydraulic ram positioned above said shaft and having horizontally extending trunnions projecting from opposite side wall portions thereof; bearing means fixed to said supporting brackets for rotatably supporting said first shaft and said trunnions; a second horizontally extending shaft spaced from said first shaft and parallel thereto, said second shaft being connected to the piston rod of said hydraulic ram; at least one bearing member connecting said second shaft with said first shaft; a bell-crank shaped element movable with said bearing member and projecting outwardly therefrom; means for pivotally connecting the outer end of said bell-crank shaped element with the truck gate at a point spaced from the inner edge of said gate; and parallelogram linkage connecting portions of the supporting brackets spaced outwardly from said first shaft with inner edge portions of the truck gate, said linkage including a pair of links pivotally connected to said second shaft and extending inwardly therefrom when the gate is in lowered position.

6. In an elevator for truck gates, a pair of spaced supporting brackets depending from the truck body adjacent an edge thereof; a first horizontally extending shaft parallel with and spaced below said body edge and positioned adjacent said supporting brackets; an hydraulic ram positioned above said shaft and having horizontally extending trunnions projecting from opposite side wall portions thereof, the axis of said trunnions being parallel with the axis of said first shaft; bearing means fixed to said supporting brackets for rotatably supporting said first shaft and said trunnions; a second horizontally extending shaft spaced outwardly from said first shaft and parallel thereto, said second shaft being connected to the piston rod of said hydraulic ram; at least one bearing member connecting said second shaft with said first shaft; a bell-crank shaped element movable with said bearing member and projecting outwardly therefrom; means for pivotally connecting the outer end of said bell-crank shaped element with the truck gate at a point spaced from the inner edge of said gate; and parallelogram linkage connecting portions of the supporting brackets spaced outwardly from said first shaft with inner edge portions of the truck gate, said linkage including a pair of links pivotally connected to said second shaft and extending inwardly therefrom when the gate is in lowered position.

WALTER W. WOHLFORTH.

REFERENCES CITED

The following references are of record in the file of this patent:

UNITED STATES PATENTS

| Number | Name | Date |
|---|---|---|
| 747,899 | Wall | Dec. 22, 1903 |
| 758,493 | Abbey | Apr. 26, 1904 |
| 1,898,483 | Earnheart et al. | Feb. 21, 1933 |
| 2,389,221 | Wachter | Nov. 20, 1945 |
| 2,391,813 | Wood | Dec. 25, 1945 |
| 2,414,684 | Wohlforth | Jan. 21, 1947 |